United States Patent [19]

Marien

[11] 4,397,972

[45] Aug. 9, 1983

[54] FLAME RETARDANT POLYSTYRENE AND POLY(PARA-METHYLSTYRENE) COMPOSITIONS CONTAINING OCTAHALOBIPHTHALYL

[75] Inventor: Bruce A. Marien, East Windsor, N.J.

[73] Assignee: Mobil Oil Corporation, New York, N.Y.

[21] Appl. No.: 454,773

[22] Filed: Dec. 30, 1982

[51] Int. Cl.$^3$ .............................................. C08K 5/15
[52] U.S. Cl. .................................................... 524/109
[58] Field of Search ...................... 585/184; 524/109; 526/347.1

[56] References Cited

U.S. PATENT DOCUMENTS

| | | | |
|---|---|---|---|
| 4,143,084 | 3/1979 | Kaeding et al. | 585/454 |
| 4,242,465 | 12/1980 | Canterino | 524/371 |
| 4,255,531 | 3/1981 | Arbit | 525/227 |
| 4,260,694 | 4/1981 | Schwab | 525/314 |
| 4,275,179 | 6/1981 | Sherman | 525/95 |

OTHER PUBLICATIONS

F. Ramirez et al., "New Reactions of Phosphite Esters: the Conversion of Phthalic Anhydride into Biphthalyl by Trialkyl Phosphites and into Phthalide-3-Phosphonates by Dialkyl Phosphites"—J. Am. Chem. Society, vol. 83, pp. 173-178 (Jan. 5, 1961).
Chemical Week, Feb. 17, 1982–pp. 44 and 45.

*Primary Examiner*—Veronica P. Hoke
*Attorney, Agent, or Firm*—Charles A. Huggett; Michael G. Gilman; Edward J. Trojnar

[57] ABSTRACT

Flame retarded compositions of styrene or para-methylstyrene polymers and containing octahalobiphthalyl, such as octabromobiphthalyl, and inorganic flame retardant, such as antimony trioxide.

11 Claims, No Drawings

FLAME RETARDANT POLYSTYRENE AND POLY(PARA-METHYLSTYRENE) COMPOSITIONS CONTAINING OCTAHALOBIPHTHALYL

BACKGROUND OF THE INVENTION

There has been an increased recent demand for styrene and other resins of reduced flammability. Various methods have been proposed to make styrene resins, and poly(para-methylstyrene) resin, including high-impact polystyrene, high-impact poly(para-methylstyrene), styrene-acrylonitrile-butadiene copolymers, styrene-methyl methacrylate-butadiene copolymers, and the like, less flammable. For example styrene resins and poly(para-methylstyrene) resins having a reduced tendency to ignite and propagate flame in the absence of an external heat source have been prepared by adding an organic halide and an inorganic flame retardant, such as antimony trioxide.

Organic halides are very effective in providing the polymers with a reduced tendency to ignite and burn in the absence of an external heat source, but have a tendency to make the polymers drip while they are burning, and, in order to achieve flame retarded compositions in the range of V-1 to V-0 provided under Subject 94 by Underwriter's Laboratories, Inc. (hereinafter referred to as UL-94), a large amount of halide must be added. The use of antimony compounds in combination with the halides is known to be effective in overcoming the dripping problem. However, even with the addition of the antimony compounds, the polymers tend to drip as the thickness of polymer moldings becomes smaller, and it is very difficult to bring the polymers to conform to the range of V-1 to V-0 under UL 94. In accordance with this invention, octahalogenated biphthalyl is used as the organic halide in conjunction with an inorganic flame retardant such as antimony trioxide to achieve excellent flame-retardancy.

The tests employed herein to demonstrate suppressed ignition properties and burning accurately demonstrate the ignition or burning characteristics of the polymers when exposed to small scale ignition sources according to the standards specified. It is well recognized by those skilled in the art and it should be clearly understood that all known organic polymers will burn when subjected to a sufficiently intense heat source whether or not they contain a fire-retardant additive. "To drip" or "dripping" referred to hereinafter, according to the vertical burning tests under UL-94, means to drip particles from a specimen during the application of a test flame or after the removal of the flame. Failure to achieve a V-1 or V-0 rating results when the dripping particles ignite a piece of cotton held under the specimen, regardless of whether or not the particles were flaming.

SUMMARY OF THE INVENTION

The present invention provides flame-retardant compositions comprising a polymer or copolymer of styrene or para-methylstyrene; an inorganic flame-retardant; and octahalogenated biphthalyl.

DESCRIPTION OF THE SPECIFIC EMBODIMENTS

The flame-retarded polystyrene or polymethylstyrene resins of the present invention can be prepared from styrene or the mixture of methylstyrene isomers alone, described below. The resins can be random, block or graft copolymers derived from 50 weight percent or more of styrene or the defined methylstyrene isomers.

The polymethylstyrene resins useful in the present invention comprised entirely of polymerized methylstyrene can be obtained by polymerizing a mixture of isomers in which ortho-methylstyrene comprises less than 0.1, preferably less than 0.05 weight percent; meta-methylstyrene comprises less than 15, preferably less than 10 weight percent; and para-methylstyrene comprises 85-100, preferably at least 90 weight percent.

Generally, the proportion of the para-methylstyrene isomer will be at least 95 weight percent and the meta-methylstyrene isomer will constitute less than 5 weight percent of the mixture. Particularly preferred mixtures contain 97 to 99 weight percent of the p-isomer.

The mixture of the isomeric methylstyrenes for the preparation of the polymethylstyrene resins can be obtained by the catalytic dehydrogenation of a mixture of the corresponding ethyltoluenes, which in turn can be obtained by the selective alkylation process disclosed in U.S. Pat. No. 4,143,084 of Warren W. Kaeding and Lewis B. Young, the disclosure of which is incorporated herein by reference.

The reduced flammability of the resin composition of the present invention is obtained by utilizing octahalogenated biphthalyl and an inorganic flame retardant such as an antimony compound. Octabrominated and octachlorinated biphthalyl are particularly suitable.

The antimony compounds used according to the present invention include antimony trioxide, antimony pentoxide, antimony trichloride, antimony trisulfide, and the like.

The proportions of inorganic flame retardant and octahalobiphthalyl will vary somewhat depending on the nature of the polymer, the inorganic flame-retardant and the degree of flame-retardancy desired. In general, the inorganic flame retardant will be preset in an amount of 3 to 8 weight percent of the polymer and the octahalobiphthalyl in an amount of 10 to 20 weight percent of the polymer, preferably 12 to 16 weight percent.

Octabromobiphthalyl ($C_{16}O_4Br_8$) can be prepared from tetrabromophthalic acid and triethylphosphite in accordance with the method of F. Ramirer et al, Journal of the Americal Chemical Society, Vol. 83, p. 173 (1961), which is incorporated herein by reference.

In mixing the aforementioned components, an intended kneaded mixture may be obtained by first mixing the component materials by an ordinary mixing machine such as a mixer, drum blender or kneader and, then, kneading the mixture through an extruder or melt-kneading the same through a heating roll, Banbury mixer or other suitable means. In this case, a coloring agent, plasticizer, stabilizer, ultraviolet absorber, foaming agent, inorganic reinforcing agent and/or other additives which do not adversely affect the resin composition according to the present invention may be added in a suitable amount as required.

The invention is illustrated by the following non-limiting example.

EXAMPLE

Octabromobiphthalyl and antimony trioxide were blended with high impact polystyrene (8percent butadiene rubber) in the weight proportions below. The compositions were subjected to testing as provided under Subject 94 by Underwriter's Laboratories Inc. The results are summarized in the Table.

TABLE

| WEIGHT % ADDITIVES | | FLAMMABILITY RATING | |
|---|---|---|---|
| Octabromo-biphthalyl | SbO$_3$ | ⅛ inch Specimen | 1/16 inch Specimen |
| 16 | 5 | V-O | V-O |
| 14 | 4 | V-O | V-O |
| 12 | 3 | V-O | Burning |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A flame-retarded composition comprising:
   a. a polymer or copolymer containing at least 50 weight percent of polymerized styrene; or methylstyrene isomers consisting essentially of 0–0.1 percent by weight ortho-methylstyrene, 0–15 percent by weight meta-methylstyrene, and at least 85 percent by weight para-methylstyrene;
   b. an inorganic flame retardant; and
   c. octahalogenated biphthalyl.

2. The composition of claim 1 wherein sufficient amounts of flame-retardants are added to achieve a V-0 flame-retardancy under UL-94 flammability test.

3. The composition of claim 1 wherein the mixture of isomers of methylstrene consists essentially of at least 90% by weight para-methylstyrene, 0–10% by weight meta-methylstyrene, and 0–0.1% by weight ortho-methylstyrene.

4. The composition of claim 1 wherein the mixture of isomers of methylstyrene consists essentially of at least 95% by weight para-methylstyrene, 0–5% by weight meta-methylstyrene, and 0–0.5% by weight ortho-methylstyrene.

5. The composition of claim 1 wherein (a) is a high impact graft copolymer comprising a backbone polymer chain which is selected from the group consisting of polybutadiene, a styrene-butadiene rubber, an ethylene-propylene rubber, an ethylene-propylene-diene elastomer; and graft polymeric units derived from said polymerizable mixture of methylstyrene isomers grafted thereto.

6. The composition of claim 1 wherein (a) is a high impact graft copolymer of styrene comprising a backbone polymer chain which is selected from the group consisting of polybutadiene, a styrene-butadiene rubber, an ethylene-propylene rubber, an ethylene-propylene-diene elastomer; and graft polymeric units derived from styrene grafted thereto.

7. The composition of claim 1 in which (a) is crystal polystyrene.

8. The composition of claim 1 in which (a) is crystal poly(para-methylstyrene).

9. The composition of claim 1 in which said inorganic flame retardant is antimony trioxide.

10. The composition of claim 1 in which said octahalogenated biphthalyl is octabromobiphthalyl.

11. The composition of claim 1 in which said inorganic flame retardant is antimony trioxide which is present in an amount of 3 to 8 weight percent of the homo-polymer or copolymer and said octahalogenated biphthalyl is octabromobiphthalyl which is present in an amount of 10 to 20 weight percent.

* * * * *